(12) United States Patent
Le

(10) Patent No.: US 8,838,675 B2
(45) Date of Patent: Sep. 16, 2014

(54) HOST-TERMINAL DEVICE COMMUNICATION SYSTEM

(75) Inventor: Trong Le, Mississauga (CA)

(73) Assignee: Psion Inc., Mississauga, Ontario (CA)

( * ) Notice: Subject to any disclaimer, the term of this patent is extended or adjusted under 35 U.S.C. 154(b) by 1137 days.

(21) Appl. No.: 11/738,701

(22) Filed: Apr. 23, 2007

(65) Prior Publication Data

US 2008/0263133 A1   Oct. 23, 2008

(51) Int. Cl.
*G06F 15/16* (2006.01)
*G06F 13/38* (2006.01)

(52) U.S. Cl.
CPC .................................. *G06F 13/385* (2013.01)
USPC ......................................... 709/203; 719/324

(58) Field of Classification Search
None
See application file for complete search history.

(56) References Cited

U.S. PATENT DOCUMENTS

| | | | | |
|---|---|---|---|---|
| 5,398,932 A | * | 3/1995 | Eberhardt et al. | 463/29 |
| 5,938,729 A | * | 8/1999 | Cote et al. | 709/224 |
| 6,236,462 B1 | * | 5/2001 | Terasaka | 712/1 |
| 6,356,951 B1 | * | 3/2002 | Gentry, Jr. | 709/250 |
| 6,473,783 B2 | * | 10/2002 | Goshey et al. | 709/203 |
| 6,785,894 B1 | * | 8/2004 | Ruberg | 719/321 |
| 2004/0153511 A1 | * | 8/2004 | Maynard et al. | 709/206 |
| 2006/0031597 A1 | | 2/2006 | Shieh | |

OTHER PUBLICATIONS

Notice of Allowance for Canadian Patent Application No. 2585667 mailed on Oct. 22, 2012.
Office Action for Canadian Patent Application No. 2585667 mailed on Sep. 12, 2011.

* cited by examiner

*Primary Examiner* — Hieu Hoang
*Assistant Examiner* — Nam Tran

(57) ABSTRACT

A virtual device residing on a terminal in a host terminal environment is provided. The terminal is in communication with a device. The virtual device comprises a processing module operable to execute at least one action and to process information returned from at the least one executed action, a transformation module operable to transform a command into the at least one action to be executed by the processing module, and a response module operable to form a response to the command to be sent to the host based on the processed information.

24 Claims, 9 Drawing Sheets

HOST-TERMINAL DEVICE COMMUNICATION SYSTEM

FIELD OF THE INVENTION

The present invention relates generally to device communication systems, and more particularly to host-terminal device communication systems.

BACKGROUND

In a traditional host-terminal architecture, the terminal is only responsible for displaying information to a user and receiving input from the user. The terminal does not process any information. The input information is passed to the host for processing. This places a burden on the processing capabilities of the host as well as the communication medium linking the host and terminal.

Communication from host to terminal is done by pages or screens. A page specifies what information to display and where to display it. Input data at the terminal can be displayed immediately, but only in specified input fields of a page, otherwise input is sent back to the host without displaying at the monitor.

Terminal emulation is a software package that emulates a terminal model. For example, a VT200 terminal emulation that runs on a Microsoft Windows PC is software that receives VT200 commands and transforms that into commands for Microsoft Windows PC, and sends back input data in VT200 format. The host has no knowledge that it communicates with an emulator, not a true VT200 terminal.

FIG. 1 depicts in a schematic a computer system 100 with terminal emulation as may be found in the art. Host 105 communicates with one or more terminals 115. The terminal 115 may be a computer with terminal emulation 116. The communication is controlled by host software 110. Device 125 is attached to the terminal 115 through an interface 130. Communication between the terminal 115 and the device 125 is controlled by the device driver 120.

A problem with this type of device communication system 100 is that each command to a device must be issued from the host software 110 and responded to by the terminal 115. The terminal does not process commands, or information, as a result all error correction, exception handling, and any other information processing is done by the host 105. This requirement places a processing burden on the host 105, as well as wasting communication bandwidth.

Furthermore, in order for the host software 110 to issue commands to the terminal 115 that will be recognized by the device 125, the host software 110 must be aware of the specific device commands of the device driver 120. If a device 125 is changed or upgraded, the device driver 120 on the terminal 115 must be changed, as well as the software 110 on the host 105, in order for the software to issue commands recognized by the new device driver 120.

The use of fixed input screens is problematic. This may be particularly problematic when the device 125 is an RFID reader, which may return varying amounts of information in response to a single command. Data is placed in designated input fields. If there is not enough input fields, data is discarded. If input fields are not all filled, the host 105 has no way of knowing if there is a read error or if there is not enough tags to fill the fields.

It is also difficult to fully utilize devices 125 such as RFID readers which can be both input and output depending on applications. This type of device often has a command-response type of interface, which requires a faster response rate and the ability of changing configuration parameters on-the-fly. Host-terminal architecture is not well adapted to support this type of interface because the terminal 115 does not process information locally. For writing an RFID tag, data is sent to the terminal 115, but actual writing may not take place until some kind of a trigger at the terminal 115 is activated. This arrangement is problematic. In order to notify the user that the RFID device is activated, a "trigger pulled" event has to be sent back up to the host 105. The host 105 or host software 110 then sends a write command back to the terminal 115 to tell the device 125 to start writing the data, and a command to the terminal 115 telling it to display a warning that an RFID device has been activated. The time elapsed from when the trigger is activated until action at the device 125 is actually initiated can be seconds, which is too long for this type of operation. Also, there is no mechanism for the device 125 to communicate the status of the last operation to the host 105, or the software 110 running on the host.

Another limitation is difficulty in implementing enhancements. Data coming directly from the device 125 often requires some form of editing or processing before it can be sent back to the host 105. This may be problematic if the terminal has to support multiple device drivers. If the editing is done in the device driver 120, the same code or software will have to be included in all the drivers 120. A bug fix in one driver 120 would have to be re-done again for all the drivers.

What is needed is a design for an efficient host-terminal based system such that it can utilize the computer processing of the terminal thereby reducing the processing burden on the host, as well as reducing communication bandwidth requirement.

What is further needed is a flexible device communication system such that it allows for devices to be added, or upgraded and requires no or very little changes of software on the host.

SUMMARY OF THE INVENTION

It is an objective of the present patent disclosure to solve one or more of the problems identified above.

In accordance with an aspect of the present patent disclosure there is provided a virtual device residing on a terminal in a host terminal environment. The terminal is in communication with a device. The virtual device comprises a processing module operable to execute at least one action and to process information returned from the at least one executed action, a transformation module operable to transform a command into the at least one action to be executed by a processing module, and a response module operable to form a response to the command to be sent to the host based on the processed information.

In accordance with another aspect of the present patent disclosure there is provided a method of communicating between a host and a device connected to a terminal in a host-terminal environment. The terminal computer is in communication with the host computer. The method comprises the steps of receiving a command, transforming the command into at least one action to be executed, executing the at least one action, receiving information in response to the at least one executed action, processing the received information, and forming a response to the command based on the processed information.

In accordance with another aspect of the present patent disclosure there is provided a computer-readable medium storing instructions or statements for use in executing in a computer a method of communicating between a host and a device connected to a terminal in a host-terminal environment. The terminal computer is in communication with the host computer. The method comprises the steps of receiving a command, transforming the command into at least one action to be executed, executing the at least one action, receiving information in response to the at least one executed action, processing the received information, and forming a response to the command based on the processed information.

In accordance with another aspect of the present patent disclosure there is provided a propagated signal carrier carrying signals containing computer-executable instructions that can be read and executed by a computer. The computer-executable instructions are used to execute a method of communicating between a host and a device connected to a terminal in a host-terminal environment. The terminal computer is in communication with the host computer, the method comprises the steps of receiving a command, transforming the command into at least one action to be executed, executing the at least one action, receiving information in response to the at least one executed action, processing the received information, and forming a response to the command based on the processed information.

BRIEF DESCRIPTION OF THE DRAWINGS

Embodiments of the patent disclosure will now be described, by way of example only, with reference to the following drawings in which.

DETAILED DESCRIPTION

Figure 1:
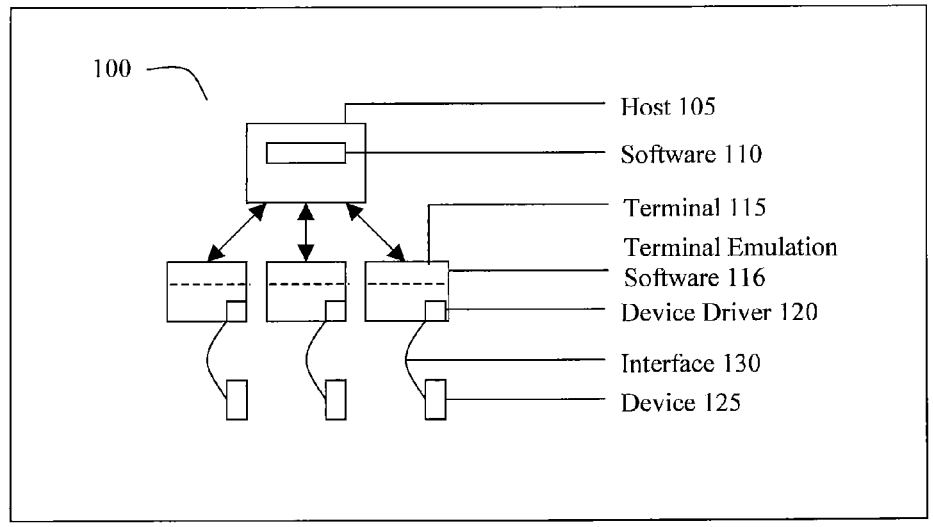
FIG. 1 depicts in a functional schematic, a typical device communication system for communication between a host and a device.

For convenience, like numerals in the description refer to like structures in the drawings.

Figure 2A:
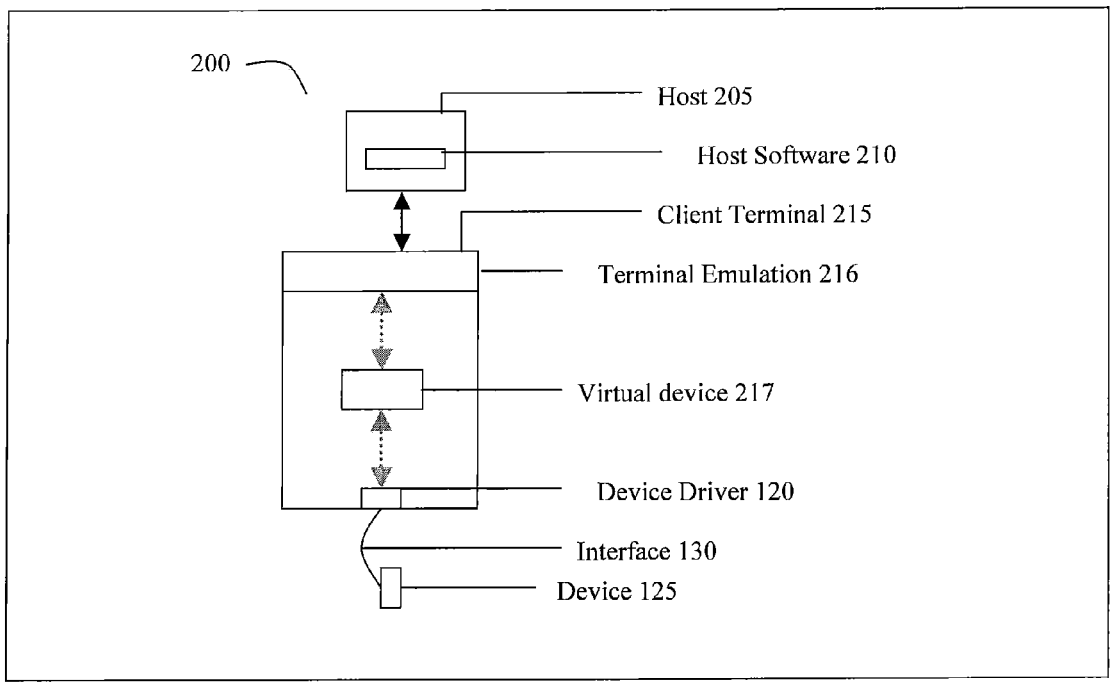
FIG. 2a depicts in a functional schematic, an example of a device communication system for communication between a host and a device, in accordance with an embodiment of a virtual device of the device communication system.

FIG. 2a depicts in a block diagram an example of components of a device communication system 200, in accordance with an embodiment of the present invention. Communication to client terminal 215 from the host 205 is controlled by host software 210. A device 125 is attached to the client terminal 215 through an interface 130. The device 125 is controlled by a device driver 120. Host software 210 can indirectly control device 125 by sending commands through terminal emulation software 216, and virtual device 217 to device driver 120. A computer running terminal emulation software 216 may be referred to as a terminal. The terminal emulation software 216 emulates the host-terminal communications used by the host 210, such that the host 210 sees the computer running terminal emulation software 216 as a traditional terminal. Responses from device 125 may be sent across the interface 130 to the device driver 120, which communicates the response to the virtual device 217. The virtual device 217 may communicate the response to the terminal emulation software 216, which communicates the response from the client terminal 215 to the host 205.

Figure 2B:
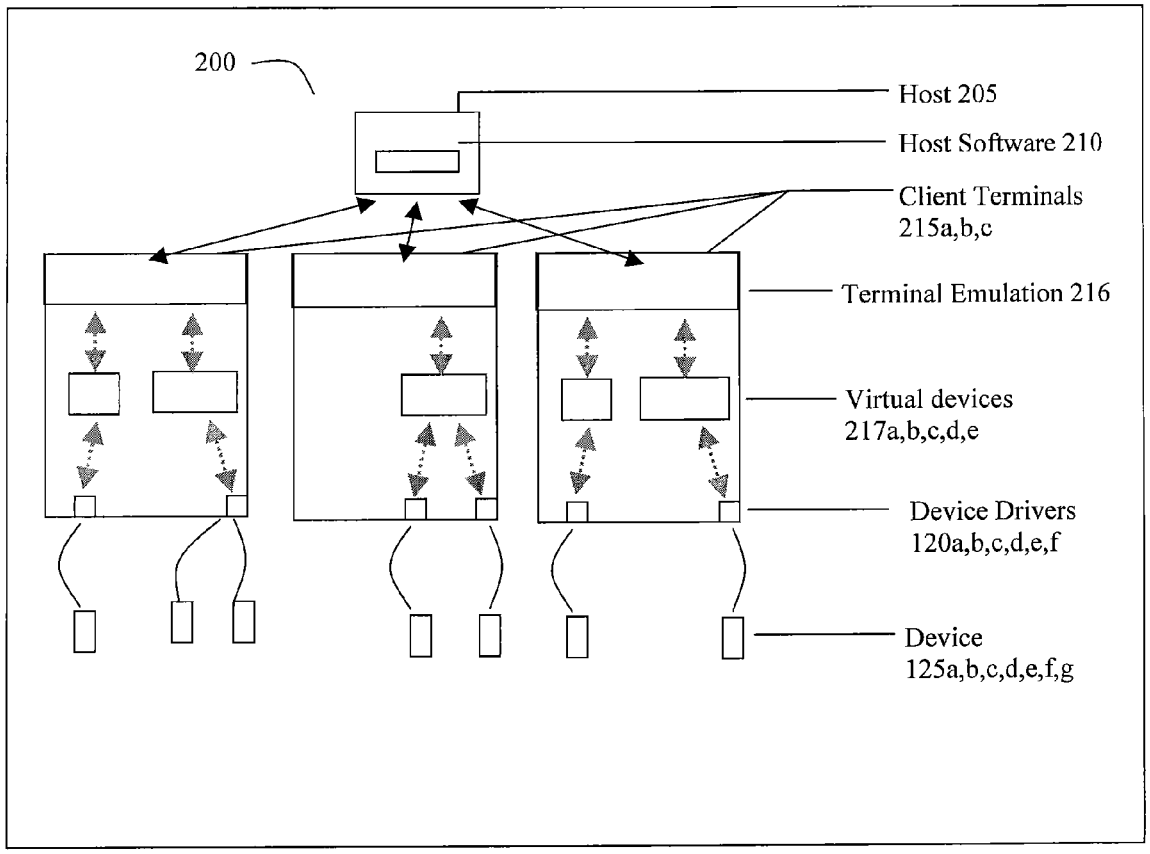
FIG. 2b depicts in a functional schematic, another example of a device communication system for communication between a host and a device, in accordance with an embodiment of a virtual device of the device communication system.

FIG. 2b depicts in a block diagram another example of components of a device communication system 200, in accordance with another embodiment of the present invention. In this embodiment multiple terminals 215a, 215b, 215c are connected to the host 205. Each terminal may have multiple virtual devices 217a, 217b, 217c, 217d, 217e residing on it, and each virtual device 217a, 217b, 217c, 217d, 217e may communicate with multiple device drivers 120a, 120b, 120c, 120d, 120e, 120f to control multiple devices 125a, 125b, 125c, 125d, 125e, 125f, 125g.

Embodiments are described with respect to a single terminal, containing a single virtual device, controlling a single device. It is understood that this is done for the purpose of more clearly describing the invention. It is understood that the embodiments described may be readily adapted to the embodiment as depicted in FIG. 2b.

Figure 3A:
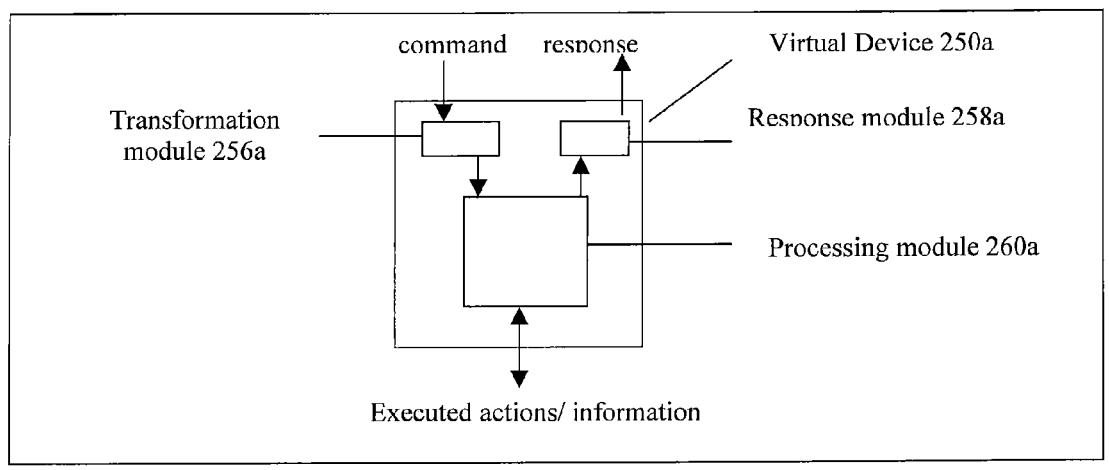
FIG. 3a depicts in a functional schematic, an example of a virtual device for data communication between a host and a device, in accordance with an embodiment of a virtual device of the device communication system.

FIG. 3a depicts in a block diagram, an example of the components of a virtual device 250a, in accordance with an embodiment of the device communication system 200. Virtual device 250a comprises three modules. The transformation module 256a receives commands from the host and transforms them into actions that are to be executed. The response module 258a prepares responses to the commands that are to be sent back to the host 205, or more particularly the host software 210. The processing module 260a executes the actions determined by the transformation module 256a. The processing module 260a may also process information received as a result of executing an action. The processed information may be used to determine the next action to take. For example, the transformation module 256a may transform a command into a plurality of actions, the processing module 260a executes the first action, and based on the result of the action may determine the next action to execute from the plurality of actions. The response module 258a prepares responses to be sent back to the host 205 in response to the command.

The processing module 260a may comprise modules for processing the information returned from an executed action. These modules may include a filtering module for filtering the received information; an error notification module for presenting an error notification; an external communications module for communicating with an external computer system; a decision module for determining an action based on received information as well as the command; and a local communications module for communicating with additional local programs to further process the received information.

Figure 3B:
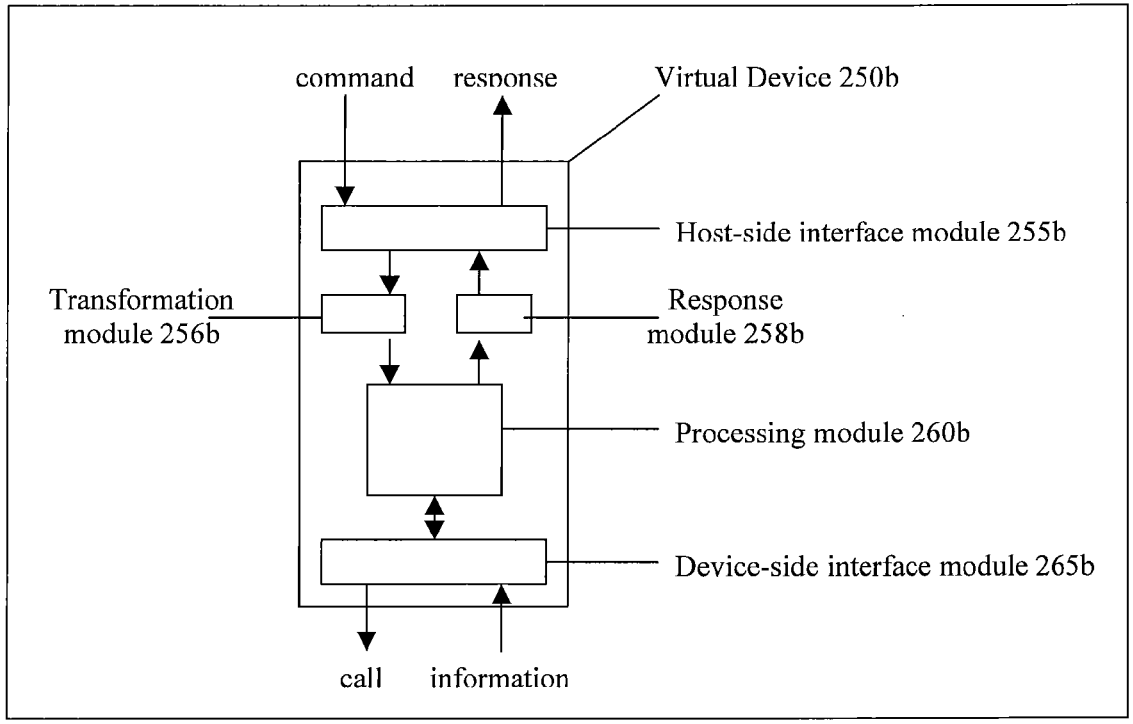
FIG. 3b depicts in a functional schematic, another example of a virtual device for data communication between a host and a device, in accordance with an embodiment of a virtual device of the device communication system.

FIG. 3b depicts in a block diagram, another example of the components of a virtual device 250b in accordance with another embodiment of the device communication system 200. The virtual device 250b comprises a transformation module 256b, a response module 258b and a processing module 260b. These modules are similar in function to the transformation module 256a, response module 258a and processing module 260a. In addition to these modules the virtual device 250b also comprises a host-side interface module 255b and a device-side interface module 265b. The host-side interface module 255b is operable to receive host-issued commands and determine the corresponding command for the virtual device 260b. The host-side interface module 255b, also prepares command responses to be sent back to the host 205 based on responses received from the response module 258b. The device-side interface module 265b is operable to issue device specific calls for a device 125 or device driver 120 and to receive information returned from a device 125 or device driver 120 in response to the call.

Figure 3C:
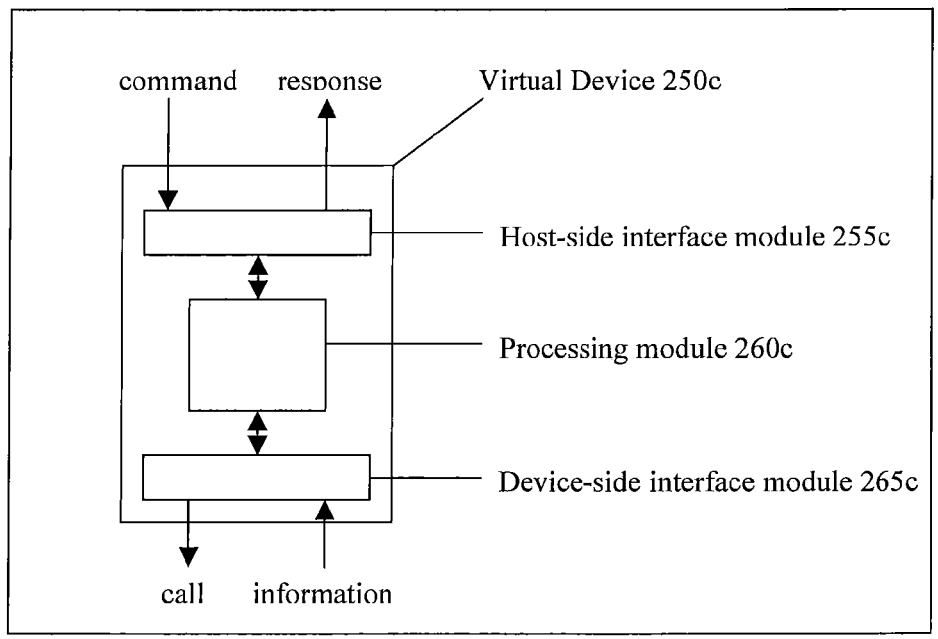
FIG. 3c depicts in a functional schematic, another example of a virtual device for data communication between a host and a device, in accordance with an embodiment of a virtual device of the device communication system.

FIG. 3c depicts in a block diagram, another example of the components of a virtual device 250c in accordance with another embodiment of the device communication system. Virtual device 250c comprises three modules. The host-side interface module 255c receives commands from the host 205 and sends responses back to the host 205. The device-side interface module 265c issues device driver 120 calls and receives information returned from the device driver 120. The processing module 260c processes received commands and determines necessary actions to take. These actions may include transforming the host-issued command into device specific calls. If the host-issued command is intended for the virtual device 250c, the actions may include determining virtual device instructions to be executed by the virtual device 250c. These instructions may include: start virtual device, reset virtual device, and stop virtual device. The actions may also include a response action, determined by the processing module 260c. The response action is the next action to be taken by the virtual device 250c. It may be determined based on the processing of returned information. For example, if the processed information indicates that the issued device driver 120 call was not successfully executed, the response action may include a prompt to the user indicating that the call was not executed and prompting a user to determine whether the device driver 120 call should be retried. The processing module 260c also processes information returned from a device 125 and determines the responses to be sent to the host 205. In other words, virtual device 250c can determine the actions taken locally without intervention from the host 205, or host software 210. Only the end results, which are expected by the host 205 or host software 210, are sent back.

Although the host-side interface module 255b,c, the device-side interface module 265b,c the processing module 260a,b,c, the transformation module 256a,b and the response module 258a,b are described as separate modules, it is intended that the functions carried out by each module may be incorporated into fewer or more modules, while still falling within the intended scope of the claims of the present patent disclosure.

Communication from the host 205 to the virtual device 217,250a,b,c may be command-response and packet based. Data may be exchanged in packet format, and for every command, there may be a corresponding response.

Figure 4:
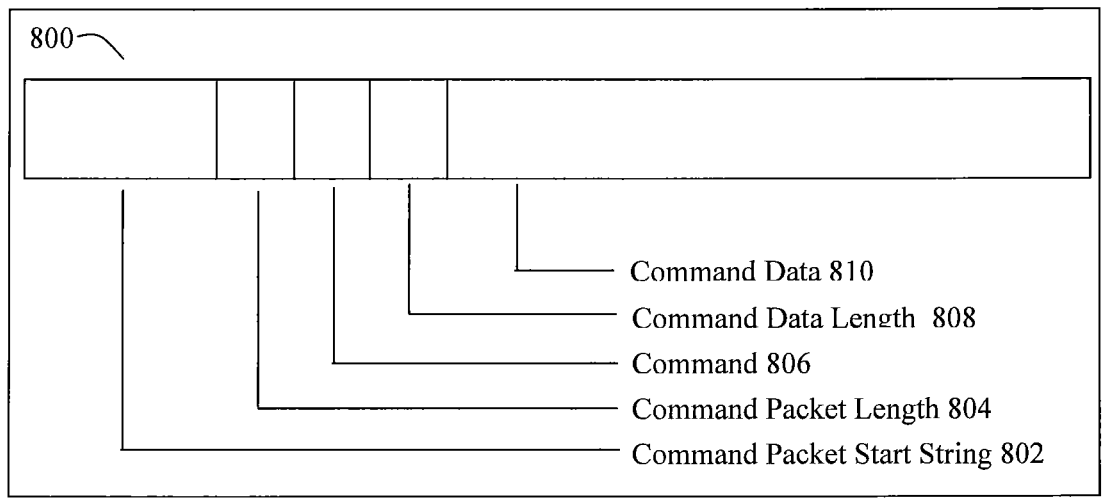
FIG. 4 depicts in a functional schematic, an example of a sample packet format which may be used in a device communication system, in accordance with an embodiment of a virtual device of the device communication system.

FIG. 4 shows an example of a possible format of a command packet 800 that may be used for sending commands to the client terminal 215. The Command Packet Start String field 802 consists of one or more characters, as agreed upon between the host 205 and terminal 215, indicating the start of a command packet 800. The Command Packet Length field 804 is a fixed length field containing a value representing the length of the command packet excluding the length of the Command Packet Start String field 802 and the length of the Command Packet Length field 804. The Command field 806 is a value indicating a coded command. The Command Data Length field 808 is a value indicating the length in bytes of the Command Data field 810. The Command Data field 810 contains data particular to the command coded in the Command field 806.

Figure 5:
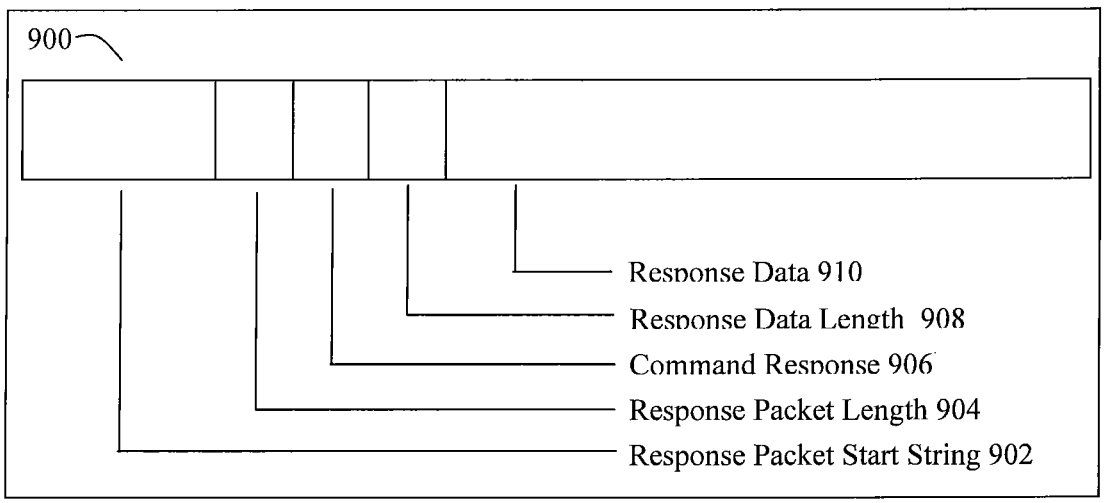
FIG. 5 depicts in a functional schematic, an example of a sample packet format which may be used in a device communication system, in accordance with an embodiment of a virtual device of the device communication system.

FIG. 5 shows an example of a possible format of a response packet 900 that may be used for sending command responses from the client terminal 215. The Response Packet Start String field 902 consists of one or more characters, as agreed upon between the host 205 and terminal 215, indicating the start of a response packet 900. The Response Packet Start String 902 for the response packet 900 does not need to be the same as the Command Packet Start String 802 of the command packet 800. The Response Packet Length field 904 is a fixed length field containing a value representing the length of the response packet excluding the length of the Response Packet Start String field 902 and the length of the Response Packet Length field 904. The Command Response field 906 is a value indicating a coded terminal command response. Different commands may expect a different response. The Command Response field 906 may be used to identify the command that the response is associated with. The Response Data Length field 908 is a value indicating the length, in bytes, of the Response Data field 910. The Response Data field 910 comprises data particular to the command response coded in the Command Response field 906.

In order for the client terminal emulation software 216 and the host software 210 to correctly identify packets, whether command 800 or response 900 packets, a packet start string is chosen that does not appear in a normal data stream. The packet start string must be agreed upon between the host 205 and the terminal emulation software 216. In a preferred embodiment, the packet start string is user-configurable so that an appropriate string may be chosen based on an enterprise's specific requirements. The packet start string chosen for the Command Packet Start String 802 may be the same as the packet start string chosen for the Response Packet Start String 902. Alternatively a different packet start string may be used for the Command Packet Start String 802 and Response Packet Start String 902.

In a specific embodiment using IBM 3270 and/or 5250 variants of terminals, a possible method of sending the command packets 800 from the host to the client terminal is to have the host embed the command packet in an output field of a screen sent to the client terminal. The client terminal emulation software 216 scans the output fields, and identifies the command packets 800 using the agreed upon Command Packet Start String 802. The client terminal emulation software 216 may embed Response Packets 900 in an input field of the screen sent to the host 205. The host 205 scans the input fields, and identifies the response packets 900 using the agreed upon Response Packet Start String 902.

In another specific embodiment using VT200 variants of terminals, the command packets 800 may be embedded in the device control string, DECUDK. The device control string is defined as DCS Pc;Pl where DCS is 0x90 in hex and Pc;Pl can be one of 0x00, 0x01, 0x10 and 0x11, in hex. Since Pc;Pl is not defined for values in the range of 0x12 to 0xff, any one of these values may be chosen as the Command Packet Start String 802. The client terminal emulation software 216 scans the device control string and identifies command packets 800 based on the agreed upon Command Packet Start String 802.

In a preferred embodiment, the fields: Command Packet Length 804, Command 806, Command Data Length 808, Response Packet Length 904, Command Response 906 and Response Data Length 908 each have byte values. This puts desirable limits on overall packet length and provides a safeguard against runaway data.

Following is a recommended minimum set of commands that may be issued by the host:

Reset: This command resets the device 125, associated device drivers 120, and the associated virtual device 217,250*a,b,c*.
Disable: This command disables a particular device 125.
Enable: This command enables a particular device 125.
Set Parameters: This command provides a set of values for parameters of a particular device 125.
Get Parameters: This command retrieves current parameter settings of a device 125.
Get Device Status: This command returns a short status of a particular device 125, whether it is enabled, disabled, or an operational error has occurred.

Other commands may be added as needed. For example, for an RFID device, additional commands may include: Inventory, Read Tag Data, Write Tag, Kill Tag, Lock Tag, Count Tags, etc. For a generic printer, other commands may include: Print Current Page, Set StartJobString, Set Number of Copies, Set Print Quality, etc.

The above commands are recommended for a device such as an RFID reader, scanner or generic printer. The device does not need to be limited to these types. It may include an RFID writer, an RFID reader/writer, an image capture device, a digital voice system, a sound system, a data capture device, a data output device, or a computer system. It will be appreciated that the systems and methods described herein provide for at least communicating with a device 125 connected to a terminal 215, in a host-terminal environment. The set of commands used in the communications may be altered to suit the particular type of device 125 connected to the terminal 215.

Host-issued commands may be designed to target the terminal emulation software 216, the virtual device 217,250*a,b,c* or the device driver 120. If the host command is targeted to the terminal emulation software 216, a command is not required to be passed to the virtual device 217,250*a,b,c*. Similarly, if a host command is targeted to the virtual device 217,250*a,b,c*, a command is not required to be passed to the device driver 120. If a host-issued command is directed to a virtual device 217,250*a,b,c* instead of a device 125, the action taken by the virtual device 217,250*a,b,c* may include determining the steps, or actions, required by the command, executing the steps and preparing a response to the command. Additionally, a host-issued command may target the virtual device 217,250*a,b,c* and the device 125. An example of this type of command is the Reset command, which requires the device 125 and associated drivers 120 be reset as well as the virtual device 217,250*a,b,c*.

An example, of a host-issued command directed to a virtual device 217,250*a,b,c*, may be a command such as VDversion, which determines the software version of the virtual device 217,250*a,b,c*. The virtual device 217,250*a,b,c* transforms the command into the actions necessary for determining the version of the virtual device 217,250*a,b,c*. The actions may include calling a function or method of the virtual device software designed to return the version number. The action may further include a response action comprised of processing the returned information from the function or method and preparing a response to be returned to the host 205 in a response packet 900.

Figure 6:
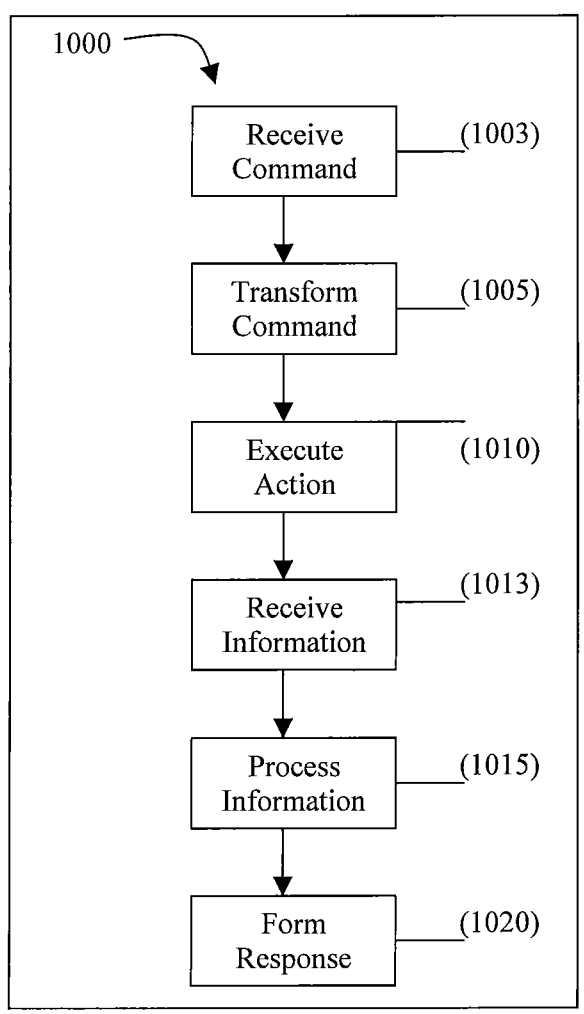
FIG. 6 depicts in a flowchart, an example of a method of communicating with a device, in accordance with an embodiment of a virtual device of the device communication system.

FIG. 6 depicts in a flowchart, an example of a method of communicating with a device 125 (1000) in accordance with an embodiment of the data communication system 200. A command sent from the host is received (1003) and transformed into at least one action at step (1005). The at least one action is executed at step (1010). The information returned as a result of the executed action is received (1013) and processed at step (1015). A response is formed based on the processed information at step (1020)

Figure 7:
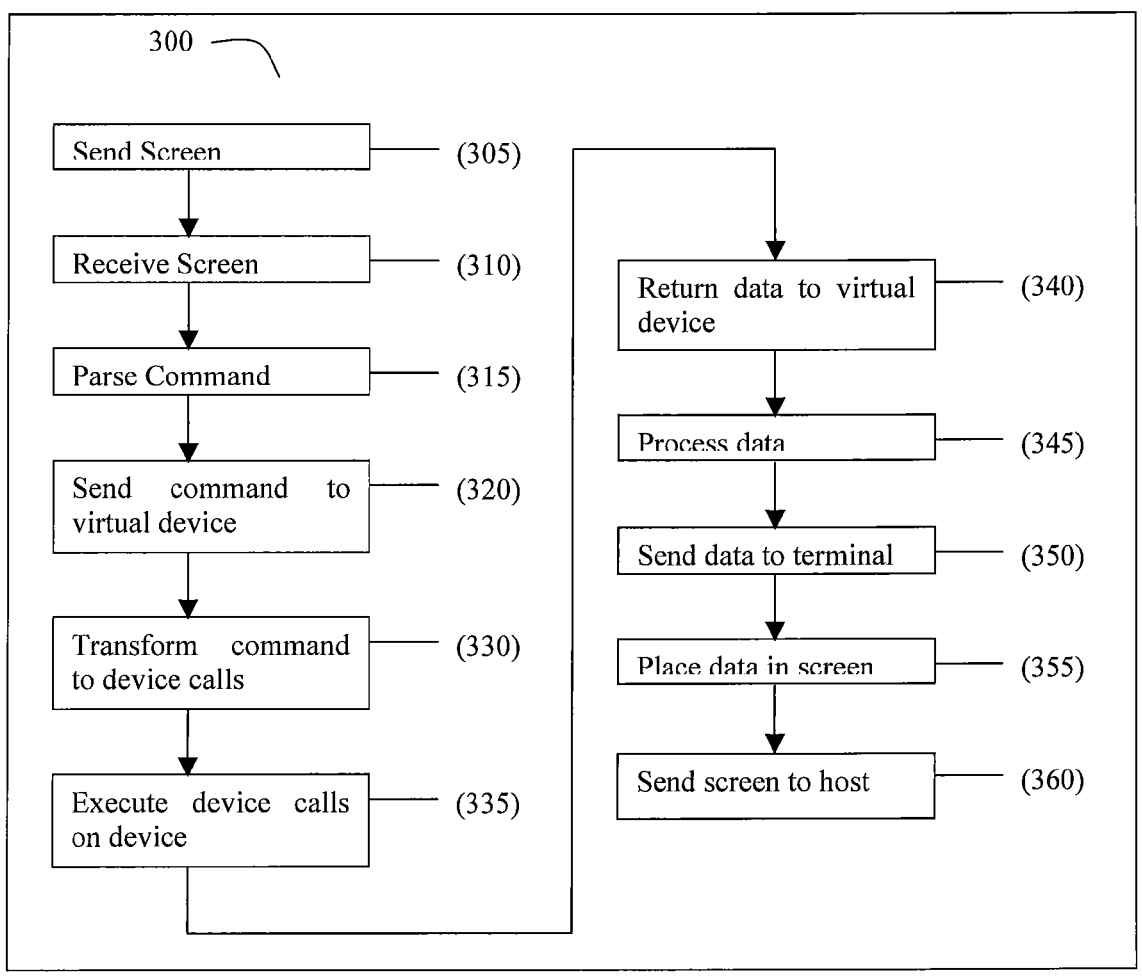
FIG. 7 depicts in a flowchart, another example of a method of communicating with a device, in accordance with an embodiment of a virtual device of the device communication system.

FIG. 7 depicts in a flowchart, an example of a method used in an IBM 3270 and or 5250 type variant host-terminal communication system (300), in accordance with an embodiment of the device communication system 200. The host 205 sends a screen to the terminal 215 (305). The screen is a set of commands and parameters; the format of which, are based on a protocol agreed upon for communication between host and terminal. The terminal 215 receives the screen (310), and the client terminal emulation software 216 parses the screen data (315) by scanning the output fields for a Command Packet Start String 802 as previously described. Once a command packet 800 is identified, the client terminal emulation software 216 parses the command information from the command packet 800, in order to determine the device command. The command is sent from the terminal 215 to the virtual device 217,250*a,b,c* (320). Once a virtual device 217,250*a,b,c* receives a command, it transforms the command into specific calls to the device driver 120, calls to the terminal emulation software or instructions for the virtual device 217, 250*a,b,c* (330). The device driver 120 executes the calls on the device 125 which returns information to the device driver 120 (335). The device driver 120 returns the information to the virtual device 217,250*a,b,c* (340). Alternatively, the virtual device 217,250*a,b,c* executes the instructions by calling appropriate functions or methods, which may return information. The virtual device 217,250*a,b,c* then processes the information returned from the device driver 120, terminal emulation software or the executed virtual device instruction (345). Once the information is processed it is sent to the terminal emulation software 216 (350) which places the information into a response packet 900 and places the response packet 900 into a screen as previously described (255). The screen containing the response packet 900 is then sent to the host 205 (360) in response to the screen sent at step (305).

The terminal emulation software 216 has been described as creating response packets 900 and parsing commands from command packets 800. Alternatively, these functions may be performed by the virtual device 217, 250*a,b,c*. The virtual device 217, 250*a,b,c* may create and send response packets 900 to the terminal emulation software 216. The terminal emulation software 216 may then embed the received response packet 900 into a screen for sending back to the host 205. The virtual device 217, 250*a,b,c* may also receive command packets 800, instead of the parsed commands, from the terminal emulation software 216. The virtual device 217, 250*a,b,c* may then parse the command from the command packet 800 as previously described.

The terminal emulation software 216 may be a separate piece of software running on the terminal computer 205, or alternatively it may be included in the virtual device as a terminal emulation module (not shown).

The amount of data returned in response to a particular host-issued command may vary in length. Since the size of the input field for a screen is fixed, the length of information required to be returned to the host 205 may be longer or shorter than the length of the input field. If the size of the returned information is less than the size of the input field, the host 205 may correctly identify the end of the response using the Response Packet Length field 804 and the Response Data Length field 808. These fields may be used to identify the length of a response packet 900. If the length of the information to be returned to the host 205 is longer than the length of the input field, another screen may be required to be sent in order to return the information to the host 205. This may be indicated in the response packet 900. The indication may include coding the information that another screen is required into the command-response field. Alternatively the response data may comprise a string indicating more data is required to be returned to the host 205.

Alternative methods of identifying whether more data is waiting to be returned to the host 205 exist. These may include appending a response information complete character or string. This character or string may be appended to the end of a response packet 900. If the host does not detect the character or string, another screen is sent to the terminal to receive further information.

For VT200 terminals, steps (355) and (360) may be combined into just one step. Data can be placed in a response packet 900 and returned to the host 205 as keyboard data, i.e. a character stream.

In a preferred embodiment of the device communication system 200, steps (330), (335), (340) and (345) are performed by a virtual device 217,250*a,b,c*.

In order to overcome the problem of the dependence of the host software 210 on the device driver 120 located on the terminal 215, device specific commands are changed to virtual device commands. The terminal 215 passes the command to the virtual device 217,250*a,b,c*. The virtual device 217, 250*a,b,c* then transforms these commands into device specific calls that are recognized by the device driver 120. Through the use of a virtual device 217,250*a,b,c*, the host 205 is no longer dependent on the specific device 125 and device driver 120 at terminal 215. If the device 125 is upgraded or replaced, the host software 210 does not need to change. A new device driver 120 that conforms to the existing virtual device 217,250*a,b,c* interface may be created. Alternatively, another type of virtual device 217,250*a,b,c* that conforms to the new device's device driver 120 may be created in order to accommodate new types of hardware devices 125. In this instance, virtual device 217,250*a,b,c* may be replaced with a new virtual device 217,250*a,b,c* that transforms the commands to the new device specific calls recognized by the new device driver 120. The host 205 may still issue the same commands to the terminal 215, which are passed onto the new virtual device 217,250*a,b,c*, which transforms the commands to the new device specific calls.

Figure 8:
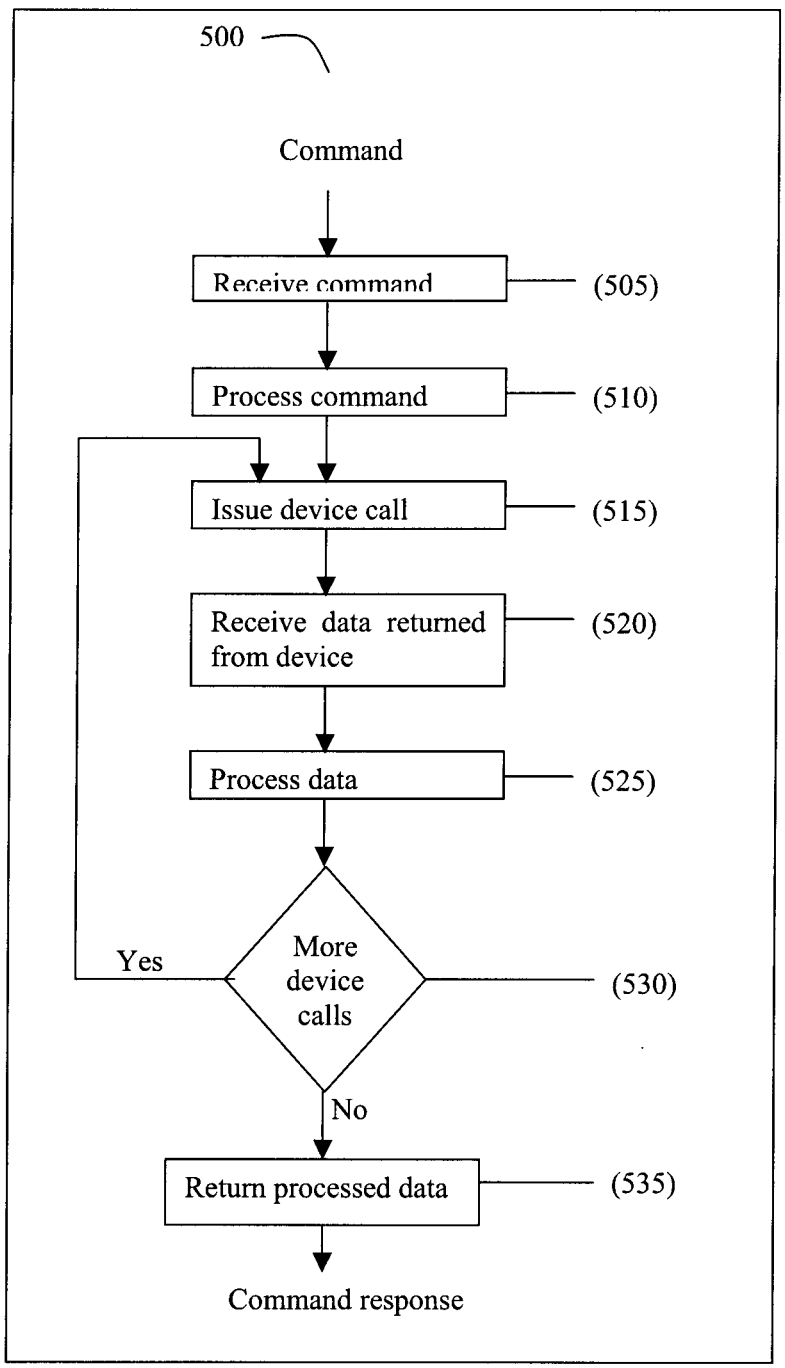
FIG. 8 depicts in a flowchart, another example of a method of communicating with a device, in accordance with an embodiment of a virtual device of the device communication system.

FIG. 8 depicts in a flowchart, another example of a method 500 of using a virtual device 217,250*a,b,c* in accordance with an embodiment of the device communication system 200. When terminal emulation 216 receives a command packet 800, it extracts the command, and passes it to the virtual device 217,250*a,b,c*. Virtual device 217,250*a,b,c* receives the host-issued command at step (505). At step (510), virtual device 217,250*a,b,c* transforms the received command into a series of calls, or actions, to be executed by the device driver 120, or the virtual device 217,250*a,b,c*. At step (515) the virtual device 217,250*a,b,c* issues the first device specific call determined at step (510) to the device driver 120. Alternatively, if the action to be taken is a call directed towards the virtual device 217,250*a,b,c*, the call may be executed by calling an appropriate function or method. If the action was determined to be a device call, the device driver 120 executes the specified call by sending appropriate signals to the device 125 using the interface 130. The device 125 then returns information to the device driver 120, which returns the information to the virtual device 217,250*a,b,c* at step (520). The virtual device 217,250*a,b,c* processes the returned information at step (525). This information may be returned from the device driver 120 or from the virtual device function or method call. This processing may include determining if the call was executed properly, filtering specific data from the returned information, determining a response action, communicating with local programs for further processing etc. At step (530), the virtual device 217,250*a,b,c* determines if there is another device specific call required for performing the command received at step (505). Determining if there is another device specific call, or virtual device call, required may be based on the command issued, the information returned from the device 125 or other criteria, such as the processing performed by additional programs. If it is determined that there is another device specific call, it is issued at step (515) and processing continues as outlined above. If the virtual device 217,250*a,b,c* determines that no more calls are required, the processed information is returned to the terminal emulation software 216, which embeds the information in a response packet 900. The response packet 900 is then returned to the host (535) as previously described As described above, virtual device 217,250*a,b,c* may transform received commands (510) and process returned information (525). These steps (510), (525) may be of varying complexity. The steps (510) and (525) do not need to be independent. Transforming a command into actions or calls may require the virtual device 217,250*a,b,c* to process information returned as a result of a previous action, or multiple actions.

When the virtual device 217,250*a,b,c* receives a host-issued command, it is transformed into at least one action. This action may comprise, for example, a device driver call, instructions to the terminal emulation software or an instruction to the virtual device itself. The action may further comprise a response action, indicating the next action for the virtual device 217,250*a,b,c*. The response action may be determined based on the information received in response to the device driver call. The response action may be to issue another device driver call, which would in turn have another response action, or it may be to present an error message to the user, or it may be to process the information received from the device 125 in response to the device driver calls issued in relation to the host-issued command or it may be to prepare a response to be sent to the host 205 in a response packet 900.

Figure 9:
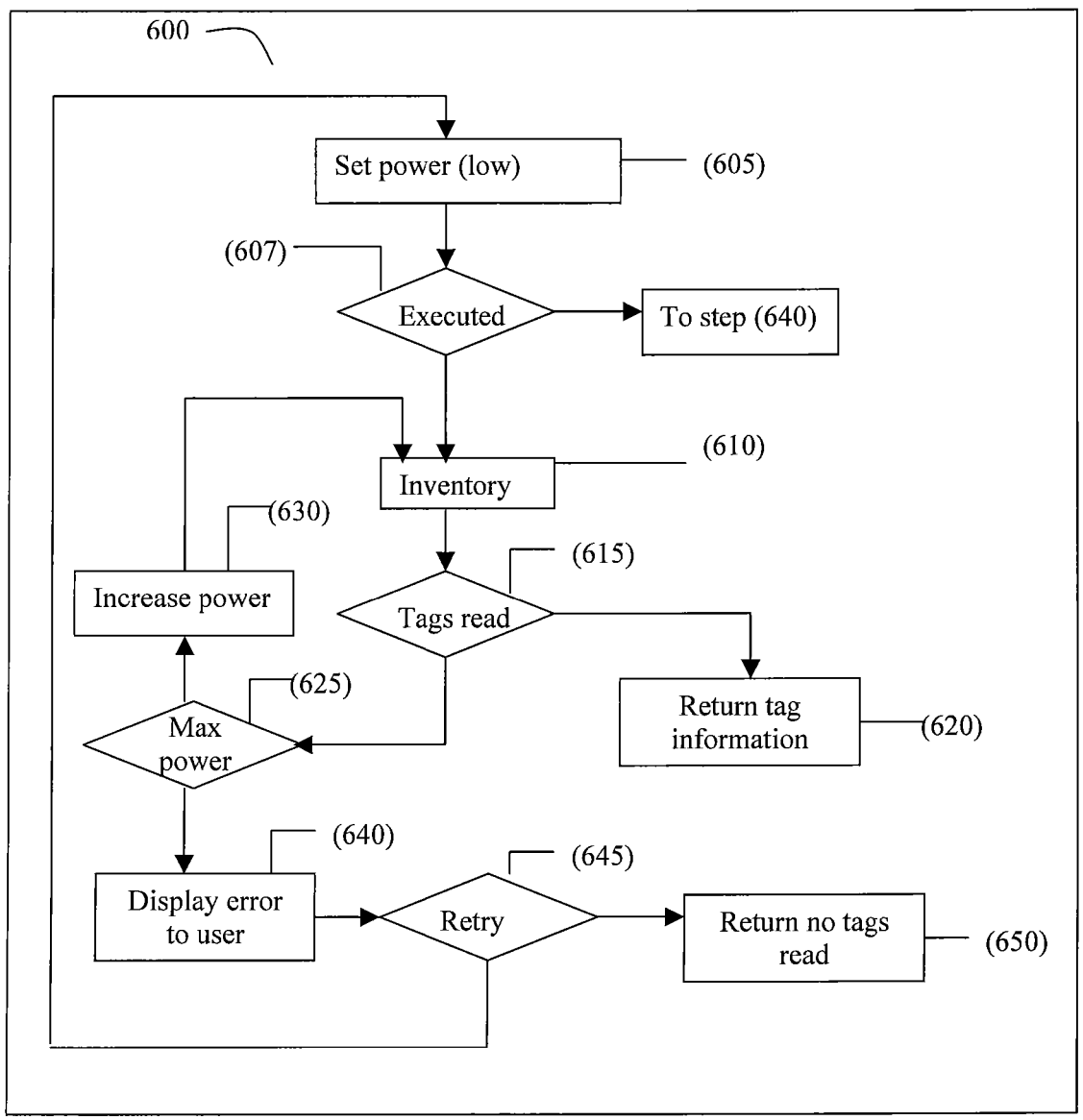
FIG. 9 depicts in a flowchart, another example of the processing of a command in accordance with an embodiment of a virtual device of the device communication system.

FIG. 9 depicts in a flowchart, an example of the processing of a command (600) in accordance with an embodiment of a virtual device 217,250*a,b,c*. In this example, the device 125 is an RFID reader, and the command received is an 'Inventory' command. The virtual device 217 receives the 'Inventory' command and transforms the command into a series of device specific calls required to execute the 'Inventory' command.

The device specific commands required to be properly executed, in order, for an Inventory command may include a SetPower call and a ReadTag call. A device specific SetPower call must be first executed at step (605). The call is made to the device driver 120. The device driver 120 in turn, sends the appropriate signals to the device 125 which executes the action, that is, sets the power of the RFID reader. The device 125 returns the result of the call to virtual device 217, the returned information may for example indicate whether the call was executed successfully. The virtual device 217 processes this information to determine a response action. At step (607) virtual device 217 processes the returned information to determine if the call was executed correctly. If the call was not executed properly by the device 125, the response action may be an alert indicating, to the user, an error has occurred (640). The user may try to correct the problem, for example by making sure there is an RFID reader attached to the terminal, and that it is functioning properly. Virtual device 217 may then determine whether the user wishes to retry (645) the command or not. If the command is to be retried, processing begins again at step (605), if not processing continues to step (650) where the virtual device 217 returns the information, in this case specifying an error has occurred, to the terminal emulation software 216, to be returned to the host 205. If the device specific call was successfully executed, virtual device 217 determines that the response action is the next device specific call and issues it. The device specific ReadTag call is issued at step (610). The device 125 executes the ReadTag call and returns the information to the device driver 120. The device driver 120 then passes the information onto the virtual device 217. At step (615) the virtual device 217 processes the information returned from the RFID reader device driver 120 to determine if any RFID tags were read. Based on the processed information, the virtual device 217 determines another response action. If no tags were read, the virtual device 217 determines if the RFID reader is set to maximum power (625). If the RFID reader is not set to maximum power, the virtual device 217 determines that the response action is to issues a device specific call at step (630) to increase the power level. If the device specific call is executed correctly by the RFID reader, the virtual device 217 then issues a ReadTag command at step (610) and processing continues outlined above. If at step (625) virtual device 217 determines that the RFID reader was set to the max power, an error is displayed to the user at step (640) and processing continues as outlined above. If at step (615) the virtual device 217 determines that tags were read then it returns the information at step (620) to terminal emulator 216, which places the response information into a response packet 900 to return to host 205. Alternatively, the virtual device 217 may process the returned information, for example to include only one field from each of the RFID tags in the response.

The processing performed by the virtual device 217 at step (525) may include filtering out information returned from the device driver 120. For example a 'Count Tags' command may be issued by host 205. The 'Count Tags' command returns only the number of tags read by a device 125. Virtual device 217 issues the necessary device specific calls to read tags from a device 125. The device driver 120 returns the information read from the device 125. The virtual device 217 counts the number of tags read and may return this number, in response to the 'Count Tags' command, to terminal emulation software 216 which prepares a response packet 900 to be sent back to the host 205.

Figure 10:
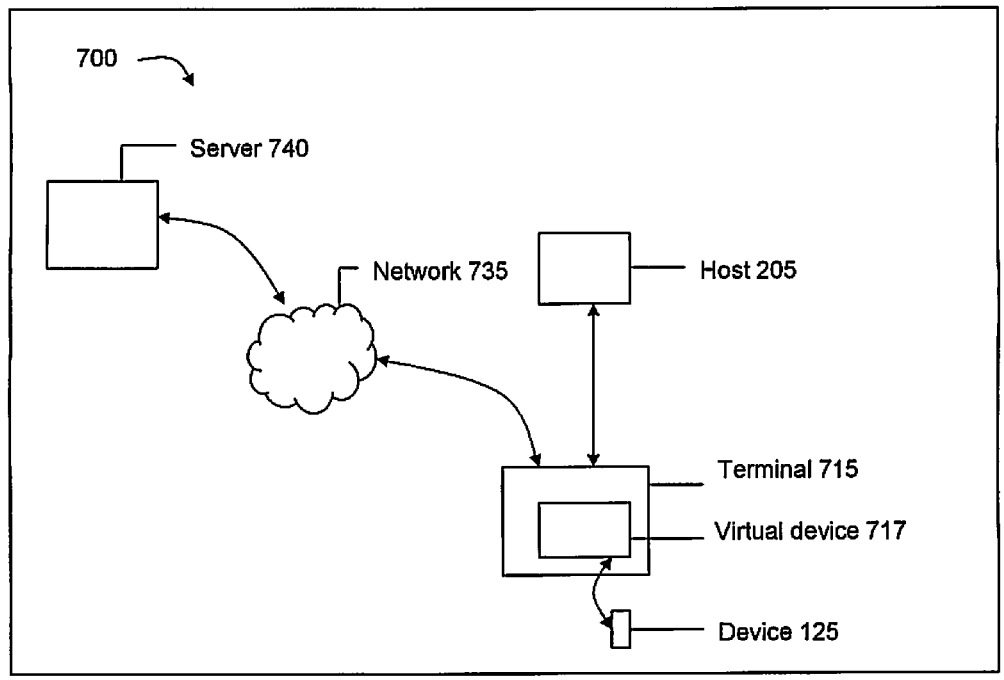
FIG. 10 depicts in a functional schematic, an example of a device communication system for communication between a host and a device, in accordance with an embodiment of a virtual device of the device communication system.

FIG. 10 depicts in a schematic drawing, an example of a device communication system 700, in accordance with another embodiment of the present invention. In this embodiment, the terminal 715 is connected to a host 205 and a server 740 through a network 735. Virtual device 717 receives commands from the host 205. The transforming of the command, or the processing of the returned information by the virtual device 717 may include communicating with a server 740. The server 740 may also issue commands to the virtual device 717. The commands sent to the virtual device 717 from the server may be transformed and processed in the same manner as described for host-issued commands. This may include issuing device driver calls to the device 125. Responses may be sent to the server 740.

By way of example, the host 205 may issue a command to the terminal directing the user to collect the items specified by a customer order. The virtual device 717 receives the command and communicates with the server 740 to obtain a list of the items contained in the customer order identified in the command. The user may then be directed to scan in the appropriate items as identified in the order. Once all items are scanned or read in, the virtual device 717 returns the information to the host 205 specifying that the order is complete. If not all objects for the order were processed the virtual device 717 may possibly communicate this information to the server 740. The server 740 may remove the processed items from the order, leaving the items not scanned or processed on the order. The host 205 may be notified by the terminal 715 that the order was not fulfilled. The notification may indicate which items were processed and which items were not processed.

Alternatively, or in addition to the communication with external computers for the transformation of commands and the processing of information, the virtual device may communicate with programs or applications stored locally on the terminal 215,715. Such applications may be one or more programs useful for further processing of information.

As outlined above the virtual device 217,250*a,b,c* may vary in complexity. It may transform a command into device specific call. Alternatively, it may be designed to process received commands and returned information. This processing may allow for error notification and exception handling to be processed at the terminal 215, 717. The virtual device 217,250*a,b,c* may also be designed to communicate with other software applications. These other applications may be located on the terminal 717, or on another system in communication with the terminal 717.

Through the use of the virtual device 217,250*a,b,c* as described herein, the processing load on a host computer 205 may be reduced by having the virtual device 217,250*a,b,c* perform some of the functions previously performed by the host 205. The virtual device 217,250*a,b,c* may also reduce bandwidth requirements by reducing the amount of messages and or information sent between the host 205 and terminal 217, 717.

The virtual device 217, 250*a,b,c* device communication 200, 700 systems and methods according to the present patent disclosure may be implemented by any hardware, software or a combination of hardware and software having the above described functions. The software code, either in its entirety or a part thereof, may be stored in a computer readable memory, or medium. Further, a computer data signal representing the software code which may be embedded in a carrier wave may be transmitted via a communication network. Such a computer readable memory, a computer readable medium and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. A terminal in a host terminal environment, the terminal in communication with a device, the terminal comprising:
   a processor for executing instructions stored in a non-transitory computer readable memory, the instructions, when executed by the processor providing a virtual device on the terminal, the virtual device configured to:
   execute, by a processing module, a plurality of actions comprising at least a device driver call and to process information returned from at least the device driver call;
   transform, by a transformation module, a command received from the host in a command packet embedded in a terminal screen into the plurality of actions to be executed by the processing module, wherein the command packet comprises:
      a command packet start string field for indicating the beginning of a command packet;
      a command packet length field for indicating the length of the command packet;
      a command field for indicating the host-issued command; and
      a command data length field for indicating the length of a command data field; and
   form, by a response module, a response to the command to be sent to the host based on the processed information, the response to the command is in the form of a response packet to be embedded in a screen having a limited input field size for sending to the host, the response including an indication that there is further processed information to be sent to the host.

2. The terminal as claimed in claim 1, wherein the virtual device is further configured to receive, by a host side interface module, the command from the host and send the command to the transformation module, and to receive, by the host side interface module, a response from the response module and to send a command response to the host.

3. The terminal as claimed in claim 2, wherein the host-side interface is further operable to communicate with an external computer to receive information from the external computer and send information to the external computer, and wherein the processing module is further operable to process the information received by the host-side interface from the external computer and to prepare information to be sent to the external computer by the host-side interface based on the processed information returned from the executed action.

4. The terminal as claimed in claim 1, wherein the plurality of actions to be executed further comprise at least one of:
   a virtual device call for controlling the virtual device; and
   a terminal emulation software call for controlling the terminal emulation software.

5. The terminal as claimed in claim 4, wherein the virtual device is further configured to issue, by a device side interface module, the device driver call for the device based on at least one of the plurality of actions to be executed by the processing module, and to return, by the device side interface module, information received from the device in response to the issued device driver call to the processing module.

6. The terminal as claimed in claim 5, wherein the terminal is in communication with a plurality of devices and, wherein the device-side interface module is further operable to issue a plurality of device driver calls for the plurality of devices.

7. The terminal as claimed in claim 4, wherein the virtual device call comprises one of:
   reset driver;
   stop driver; and
   start driver.

8. The terminal as claimed in claim 1, wherein the plurality of actions to be executed by the processing module comprises at least a first action to be executed by the processing module and a second action to be executed by the processing module, wherein the first action is determined based on at least the command, and the second action is determined based on at least one of the command and the processed information received from the device-side interface in response to the execution of the first action.

9. The terminal as claimed in claim 1, wherein the response packet comprises:
   a response packet start string field for indicating the beginning of a response packet;
   a response packet length field for indicating the length of the response packet;
   a command response field for indicating the command the response packet is sent in response to;
   a response data field comprising the response information; and
   a response data length field for indicating the length of the response data field.

10. The terminal as claimed in claim 1, wherein the response comprises an indication there is more information to be sent to the host.

11. The terminal as claimed in claim 1, wherein the response comprises an indication there is no further information to be sent to the host.

12. The terminal as claimed in claim 1, wherein the command comprises at least one of:
   reset;
   disable;
   enable;
   set parameters;
   get parameters;
   get device status;
   inventory;
   read tag data;
   write tag;
   kill tag;
   lock tag;
   count tags;
   print current page;
   set start job string;
   set number of copies; and
   set print quality.

13. The terminal as claimed in claim 1, wherein the device comprises one of:
   an RFID reader;
   an RFID writer;
   an RFID reader/writer;
   a barcode scanner;
   an image capture device;
   a printer;
   a computer system;
   a data capture device;
   a data output device;
   a digital voice system; and
   a sound system.

14. The terminal as claimed in claim 1, wherein the processing module is further configured to execute steps comprising at least one of:
   filtering, by a filtering module, received data;
   presenting, by an error notification module, an error notification;
   communicating, by an external communications module, with an external computer based on the information returned from the at least one executed action;

determining, by a decision module, an action of the plurality of actions based on the information returned from the executed action and the command; and communicating, by a local communications module, with at least one local application to further process the information returned from the at least one executed action.

15. The terminal as claimed in claim 1, wherein the transformation module receives the command in the form of the command packet, and determines the command from the command packet.

16. The terminal as claimed in claim 1, wherein the transformation module receives the command in the form of command data.

17. The terminal as claimed in claim 1, wherein the virtual device is further configured to emulate via a terminal emulation module, the host-terminal communications used by the host.

18. A method of communicating between a host and a device connected to a terminal in a host terminal environment, the terminal in communication with the host, the method comprising:

receiving a command issued from the host in a command packet embedded in a screen, wherein the command packet comprises:
   a command packet start string field for indicating the beginning of a command packet;
   a command packet length field for indicating the length of the command packet;
   a command field for indicating the host-issued command; and
   a command data length field for indicating the length of a command data field;
transforming the command into a plurality of actions comprising at least a device driver call to be executed;
executing the plurality of actions;
receiving information in response to at least the device driver call;
processing the information received in response to at least the device driver call;
forming a response to the command based on the processed information;
preparing a command response based on the response to the command;
embedding the command response in a response packet in a screen having a limited input field size; and
sending the command response embedded in the screen to the host.

19. The method as claimed in claim 18, wherein receiving the command from the host further comprises parsing the command from the screen.

20. The method of communicating as claimed in claim 19, wherein parsing the command from the embedded screen comprises identifying the embedded command based on the command packet start string field in the command packet.

21. The method as claimed in claim 18, wherein embedding the command response in the screen comprises:
   appending a command response start string to the command response; and
   placing the command response and appended command response start string in the screen.

22. The method as claimed in claim 18, wherein transforming the command into the plurality of actions to be executed comprises transforming the command into a first action to be executed and a second action to be executed based on the at least the results of executing the first action.

23. The method as claimed in claim 18, wherein the processing the received information further comprises:
   determining another action from the plurality of actions based on the processed information;
   executing the other action;
   receiving information in response to the other executed action; and
   processing the received information from the other executed action.

24. A non-transitory computer-readable medium storing instructions or statements for use in executing in a computer a method of communicating between a host and a device connected to a terminal in a host terminal environment, the terminal in communication with the host, the method comprising:

receiving a command issued from the host in a command packet embedded in a screen, wherein the command packet comprises:
   a command packet start string field for indicating the beginning of a command packet;
   a command packet length field for indicating the length of the command packet;
   a command field for indicating the host-issued command; and
   a command data length field for indicating the length of a command data field;
transforming the command into a plurality of actions comprising at least a device driver call to be executed;
executing the plurality of actions;
receiving information in response to at least the device driver call;
processing the information received in response to at least the device driver call;
forming a response to the command based on the processed information;
preparing a command response based on the response to the command;
embedding the command response in a response packet in a screen having a limited input field size; and
sending the command response embedded in the screen to the host.

* * * * *